United States Patent
Kim

(10) Patent No.: US 8,166,505 B2
(45) Date of Patent: Apr. 24, 2012

(54) BROADCAST RECEIVER AND METHOD OF CONTROLLING OPERATION OF THE BROADCAST RECEIVER

(75) Inventor: Young Jun Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 620 days.

(21) Appl. No.: 11/925,649

(22) Filed: Oct. 26, 2007

(65) Prior Publication Data

US 2008/0104653 A1    May 1, 2008

(30) Foreign Application Priority Data

Oct. 26, 2006    (KR) .................. 10-2006-0104536

(51) Int. Cl.
*H04N 7/16*    (2011.01)

(52) U.S. Cl. ............ 725/62; 725/58; 725/100; 455/423; 455/425; 455/456.1; 455/457

(58) Field of Classification Search .............. 725/58, 725/96, 100, 81; 455/423, 434, 452.2, 464, 455/457
See application file for complete search history.

(56) References Cited

U.S. PATENT DOCUMENTS

| | | | | |
|---|---|---|---|---|
| 5,862,451 A | * | 1/1999 | Grau et al. | 725/116 |
| 6,625,135 B1 | * | 9/2003 | Johnson et al. | 370/332 |
| 6,741,843 B1 | * | 5/2004 | Kalliokulju et al. | 455/226.1 |
| 7,191,244 B2 | * | 3/2007 | Jennings et al. | 709/231 |
| 2002/0174430 A1 | * | 11/2002 | Ellis et al. | 725/46 |
| 2005/0018633 A1 | * | 1/2005 | Shirota et al. | 370/331 |
| 2005/0047426 A1 | * | 3/2005 | Aaltonen et al. | 370/432 |
| 2005/0210515 A1 | * | 9/2005 | Roh et al. | 725/81 |
| 2006/0025149 A1 | * | 2/2006 | Karaoguz et al. | 455/452.2 |
| 2007/0111717 A1 | * | 5/2007 | Mueller et al. | 455/418 |

FOREIGN PATENT DOCUMENTS

| | | |
|---|---|---|
| EP | 0725489 | 8/1996 |
| EP | 1113599 | 7/2001 |
| JP | 2005244568 | 9/2005 |
| KR | 10-1997-0009296 | 2/1997 |
| KR | 10-2006-0025322 | 3/2006 |

* cited by examiner

*Primary Examiner* — Pankaj Kumar
*Assistant Examiner* — Timothy Newlin
(74) *Attorney, Agent, or Firm* — Lee, Hong, Degerman, Kang & Waimey

(57) ABSTRACT

A method of controlling operation of a broadcast receiver includes receiving a request for receiving a broadcast program at a scheduled time, measuring a level of a broadcast signal corresponding to the broadcast program prior to the scheduled time for the receiving of the broadcast program, and outputting an indicator, if the measured level of the broadcast signal is less than a predefined threshold level.

22 Claims, 5 Drawing Sheets

BROADCAST RECEIVER AND METHOD OF CONTROLLING OPERATION OF THE BROADCAST RECEIVER

CROSS-REFERENCE TO RELATED APPLICATIONS

Pursuant to 35 U.S.C. §119(a), this application claims the benefit of earlier filing date and right of priority to Korean Application No. 10-2006-0104536, filed on Oct. 26, 2006, the contents of which are hereby incorporated by reference herein in their entirety.

FIELD OF THE INVENTION

The present invention generally relates to a broadcast receiver, and more particularly, to providing signal level indicators based upon signal levels of received signals.

DESCRIPTION OF THE RELATED ART

Digital multimedia broadcasting (DMB) involves digital video techniques, audio broadcasting techniques, and services which use the digital video and audio broadcasting techniques. Thus. DMB allows users to watch broadcast programs even when moving from one place to another place. DMB has initially been developed to replace the existing terrestrial analog radio broadcasting. However, recent improvements in DMB technology have opened a way not only for transmission of audio data, but also for transmission of high-quality video data.

Examples of DMB receivers which can receive DMB programs include a DMB phone, which is a DMB terminal incorporated with a mobile phone, a personal portable device having no communication function, and a set-top box for a vehicle. Recently, such DMB receivers are widespread.

In the meantime, when a broadcast receiver is located in a gray area or a bad reception area in which it is difficult to receive radio waves, the broadcast receiver may not be able to receive broadcast signals transmitted by a broadcast transmission system or a broadcast relay system. Also, even if the broadcast receiver is located in an area in which the broadcast receiver can receive broadcast programs, the broadcast receiver sometimes may not be able to receive broadcast signals, especially when the broadcast receiver is used in a basement, in an area surrounded by buildings, or in an indoor environment.

When a broadcast receiver is located in a gray area in which the broadcast receiver cannot receive any broadcast signals, a user of the broadcast receiver cannot properly watch broadcast programs. In particular, since the user will not be able to determine whether it is possible to perform a scheduled recording or scheduled viewing of a broadcast program until the arrival of the scheduled time for recording or viewing the broadcast program, the scheduled recording or scheduled viewing of the broadcast program is likely to fail when the broadcast receiver is in the gray area. Therefore, it is necessary to notify the user whether the broadcast receiver can receive broadcast signals before the arrival of the scheduled time for reception of a broadcast program to allow the user to take appropriate measures before the broadcast program starts.

SUMMARY OF THE INVENTION

Features and advantages of the present invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Embodiments of the present invention provide a broadcast receiver and a method of controlling an operation of the broadcast receiver in which a request for receiving a broadcast program at a scheduled time is received, a level of a broadcast signal corresponding to the broadcast program is measured prior to the scheduled time for receiving the broadcast program, and an indicator is outputted if the measured level of the broadcast signal is less than a predefined threshold level.

According to an aspect of the present invention, there is provided a method of controlling an operation of a broadcast receiver which includes receiving a request for receiving a broadcast program at a scheduled time, measuring a level of a broadcast signal corresponding to the broadcast program prior to the scheduled time for the receiving of the broadcast program, and outputting an indicator, if the measured level of the broadcast signal is less than a predefined threshold level.

The indicator may be an on-screen display message or a warning sound indicating that the broadcast program cannot be received. The request may be a viewing request, a recording request, or both the viewing and recording requests. The method may further include executing either the viewing request or the recording request at the scheduled time. The broadcast program may be a digital multimedia broadcasting (DMB) program. The predefined threshold level may be a minimum signal level required for reception of the broadcast program.

According to another aspect of the present invention, there is provided a method of controlling an operation of a broadcast receiver which includes receiving a broadcast program and displaying the broadcast program, determining a current location of the broadcast receiver, and displaying gray area information, if the current location of the broadcast receiver is within a predetermined range of the gray area. The gray area defines one or more geographic locations at which the receiver receives broadcast signals at a level that is below a defined threshold.

The gray area information may be displayed as a map. The method may also include mapping the current location of the broadcast receiver onto the map. The method may further include displaying road information regarding how to avoid the gray area.

According to yet another aspect of the present invention, there is provided a broadcast receiver including a broadcast signal reception unit, which receives a broadcast signal prior to a scheduled time for viewing or recording a scheduled broadcast program, a signal level measurement unit, which measures a level of the broadcast signal received by the broadcast signal reception unit, and a control unit, which causes an indicator to be output if the measured level of the broadcast signal is less than a predefined threshold level.

The broadcast receiver may also include an input unit which receives a command for setting a request for receiving the broadcast program at the scheduled time. The broadcast receiver may further include a display unit which displays a message corresponding to the indicator, the broadcast receiver may further include a sound processing unit which outputs a warning sound corresponding to the indicator.

According to another aspect of the present invention, there is provided a broadcast receiver including a broadcast signal reception unit configured to receive a broadcast signal and a control unit configured to control the broadcast signal to be displayed and gray area information to be displayed if a current location of the broadcast receiver is within a predetermined range of the gray area.

The broadcast receiver may also include a display unit for displaying the broadcast signal and the gray area information. The broadcast receiver may further include a memory unit for storing the gray area information. The broadcast receiver may further include an input unit for receiving a command for selecting the broadcast signal. The broadcast receiver may further include a global positioning system (GPS) processing unit which determines the current location of the broadcast receiver based on a GPS satellite signal. The broadcast signal may be a broadcast signal corresponding to a digital multimedia broadcasting (DMB) program.

BRIEF DESCRIPTION OF THE DRAWINGS

Embodiments of the present invention are herein described in detail with reference to the following drawings in which like numerals refer to like elements.

The above and other aspects, features, and advantages of the present invention will become more apparent upon consideration of the following description of preferred embodiments, taken in conjunction with the accompanying drawing figures.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
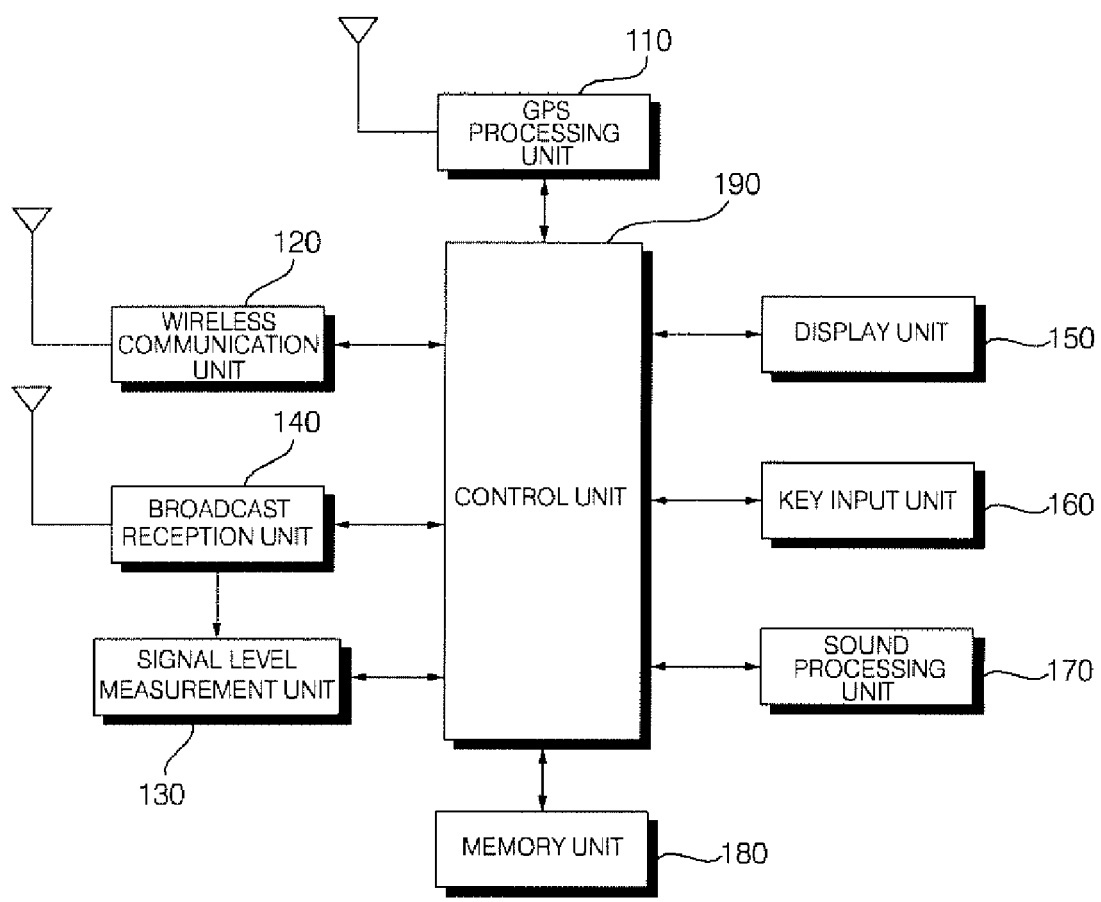
FIG. 1 is a block diagram of a broadcast receiver according to an embodiment of the present invention.

FIG. 1 is a block diagram of a broadcast receiver according to an embodiment of the present invention, and particularly, of a broadcast receiver having both a mobile communication function and a Global Positioning System (GPS) function. Referring to FIG. 1, the broadcast receiver includes a GPS processing unit 110, a wireless communication unit 120, a signal level measurement unit 130, a broadcast reception unit 140, a display unit 150, a key input unit 160, a sound processing unit 170, a memory unit 180, and a control unit 190.

The GPS processing unit 110 receives a GPS satellite signal, performs a number of signal processing operations on the GPS satellite signal, and provides information regarding the current location of the broadcast receiver. The wireless communication unit 120 provides an interface for wireless communication with a base station through an antenna. Further, the wireless communication unit 120 includes a duplex filter for filtering a signal received through an antenna, a power amplifier for amplifying a transmitted signal, a frequency up-convert circuit in a transmission path, a frequency down-convert circuit in a reception path, and the like.

The signal level measurement unit 130 measures the level of a broadcast signal received by the broadcast reception unit 140 and transmits the measured signal level to the control unit 190. The broadcast reception unit 140 receives a reproducible digital multimedia broadcast signal from a broadcast channel selected by a user, generates a broadcast signal by performing a number of operations such as a demodulation operation on the digital multimedia broadcast signal, and outputs the generated broadcast signal.

The display unit 150 may include a liquid crystal display (LCD). The display unit 150 may display a menu for controlling operation of the broadcast receiver, information regarding a state of a received broadcast signal battery information, and information regarding an operating state of the broadcast receiver that varies in response to a command input by the user, and may reproduce a broadcast program desired by the user. The key input unit 160 may include a plurality of keys, for example, number keys and function keys. The key input unit 160 transmits a signal, which corresponds to a key hit by the user, to the control unit 190, and thus, receives an operation command and data from the user The sound processing unit 170 may amplify a sound signal output by the control unit 190 and output the amplified sound signal via, for example, speakers. In addition, the sound processing unit 170 may convert a sound signal input via, for example, a microphone, into an electrical signal and transmit the electrical signal to the control unit 190. The memory unit 180 may include a read only memory (ROM), a random access memory (RAM), or a flash memory. The memory unit 180 stores programs and data necessary for operation of the mobile communication device and various other data that the user wishes to store. The memory unit 180 may store data regarding gray areas in which it is difficult for the broadcast receiver to receive broadcast signals.

The control unit 190 controls operation of the broadcast receiver by controlling the operations of the GPS processing unit 110, the wireless communication unit 120, the signal level measurement unit 130, the broadcast reception unit 140, the display unit 150, the key input unit 160, the sound processing unit 170, and the memory unit 180. More specifically, the control unit 190 controls a signal output by the broadcast reception unit 140 to be reproduced with on display unit 150. If the user sets a scheduled broadcast reception function for a predetermined broadcast program using the key input unit 160, the control unit 190 compares the measured signal level provided by the signal level measurement unit 130 with a predefined threshold. Then, if the results of the comparison indicate that it is difficult for the broadcast receiver to execute the scheduled broadcast reception function for the predetermined broadcast program, the control unit 190 causes a warning signal, such as a warning message or warning sound, to be output on the display unit 150 or sound processing unit 170.

Figure 2:
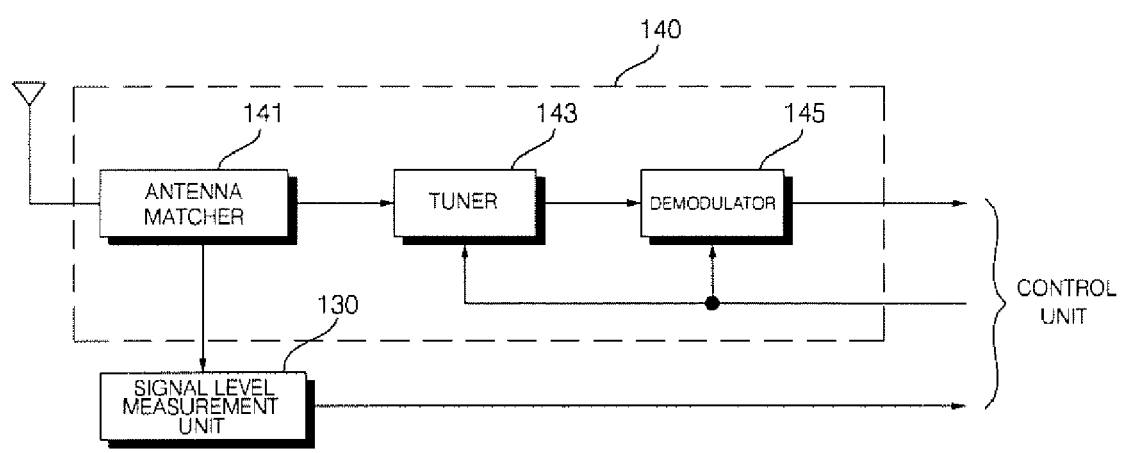
FIG. 2 is a detailed block diagram of a broadcast reception unit illustrated in FIG. 1.

FIG. 2 is a detailed block diagram of the broadcast reception unit 140 illustrated in FIG. 1. Referring to FIG. 2, the broadcast reception unit 140 includes an antenna matcher 141, a tuner 143, and a demodulator 145.

The antenna matcher 141 performs an antenna matching operation. The antenna matcher 141 may include a matching device having a variable impedance value so that the impedance of the antenna matcher 141 can vary. The antenna matcher 141 may perform an antenna matching operation by appropriately varying the impedance of the antenna matcher 141 according to the environment in which the broadcast receiver is used.

The tuner 143 receives a broadcast signal from a broadcast channel chosen by a user setting or a default setting. The demodulator 145 demodulates the broadcast signal received by the tuner 143, and generates a transport stream (TS) by performing a number of operations such as error correction on the demodulated broadcast signal. Thereafter, the demodulator 145 divides the TS into a number of element streams such as video, audio, and data streams, and generates a reproducible broadcast signal by decoding the video, audio, and data streams separately.

The signal level measurement unit 130 measures the level of a broadcast signal received by the antenna matcher 141 and transmits the measured signal level to the control unit 190. However, the signal level measurement unit 130 may not necessarily measure the level of a broadcast signal received by the antenna matcher 141. Instead, the signal level measurement unit 130 may measure the level of a broadcast signal at various locations in the broadcast receiver according to the environment in which the broadcast receiver is used.

Figure 3:
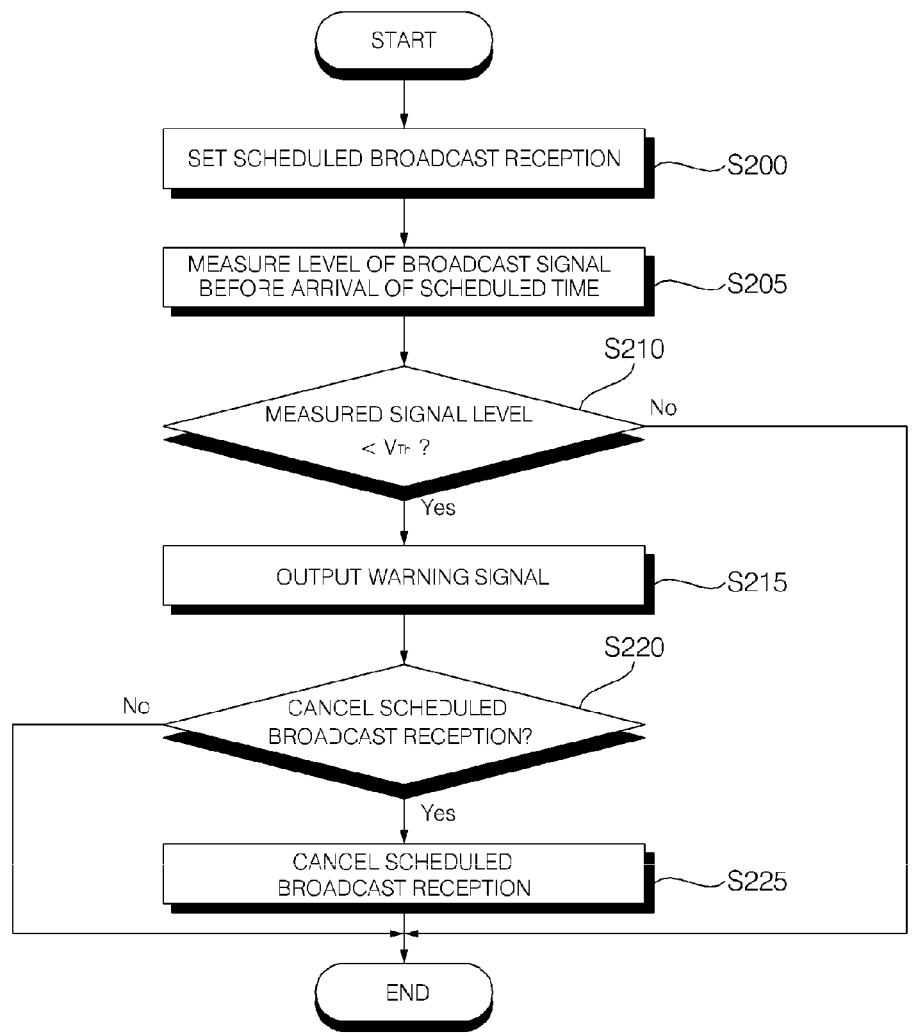
FIGS. 3 and 4 are flowcharts illustrating methods of controlling an operation of a broadcast receiver according to embodiments of the present invention.
Figure 4:
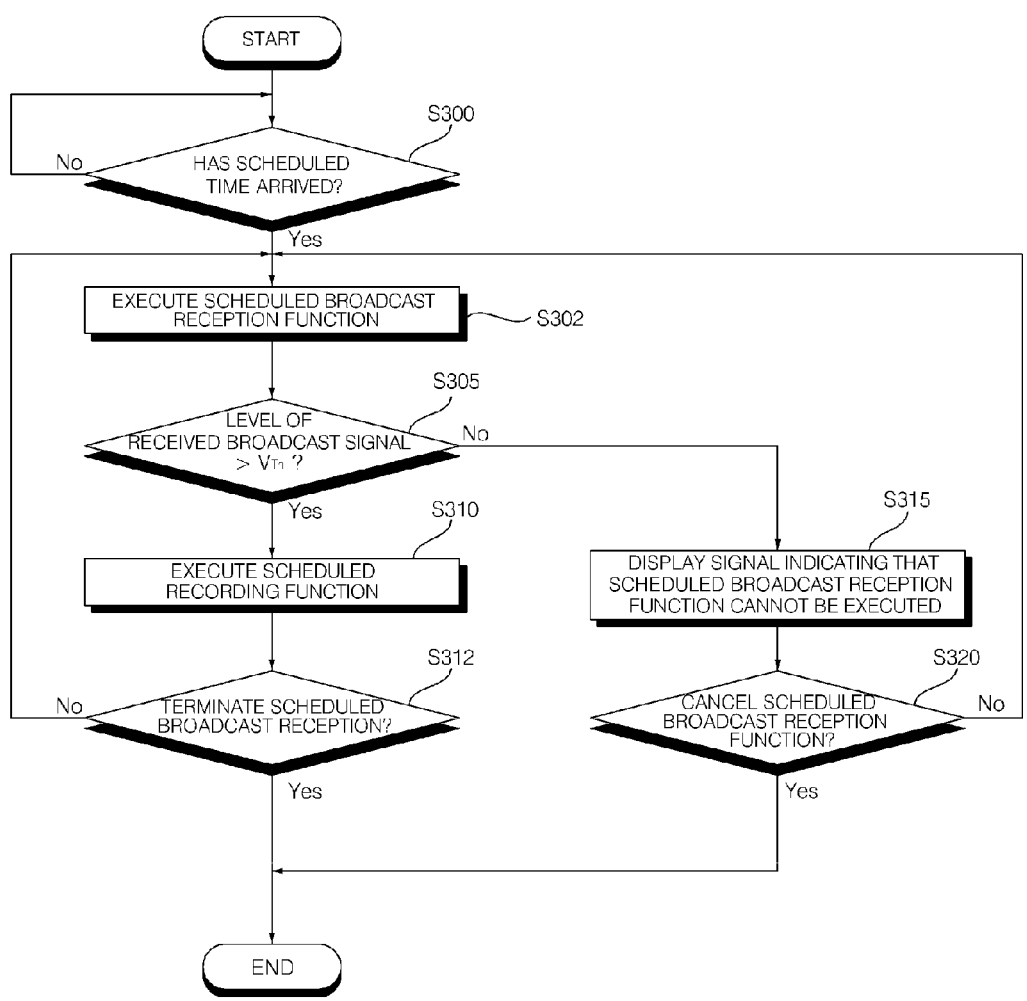

FIGS. 3 and 4 are flowcharts illustrating a method of controlling operation of a broadcast receiver according to an embodiment of the present invention. Referring to FIGS. 1 through 4, a user sets a scheduled broadcast reception function, such as scheduled viewing or scheduled recording, for a predetermined broadcast program by manipulating one or more keys of the key input unit 160 (S200). Before the arrival of a scheduled time for a scheduled reception of the predetermined broadcast program, the signal level measurement unit 130 measures the level of a reception electric field for a broadcast signal corresponding to the predetermined broadcast program with reference to scheduled time information and broadcast channel information regarding the predetermined broadcast program, and then transmits the measured signal level to the control unit 190 (S205). Then, the control unit 190 compares the measured reception electric field level with a threshold $V_{Th}$, which is stored in the memory unit 180 (S210).

The threshold $V_{Th}$ may be a minimum signal level required for the reception of broadcast programs. The control unit 190 may decide when to compare the measured reception electric field level with the threshold $V_{Th}$ based on the scheduled time for the scheduled reception of the predetermined broadcast program.

If the measured reception electric field level is less than the threshold $V_{Th}$, the control unit 190 causes a warning signal to be output (S215). The warning signal indicates that the broadcast receiver cannot receive the predetermined broadcast program at a current location. The warning signal may be an on-screen display (OSD) message displayed by the display unit 150 or a warning sound output by the sound processing unit 170. The user may take appropriate measures upon receiving the warning signal. For example, the user may move to another place to receive the predetermined broadcast program.

If the user inputs a command to cancel the scheduled broadcast reception function (S220), the control unit 190 cancels the scheduled broadcast reception function (S225).

FIG. 4 illustrates a method of controlling operation of a scheduled recording of a broadcast program upon arrival of a scheduled time. Referring to FIG. 4, when a scheduled time for a scheduled reception of a predetermined broadcast program arrives (S300), the control unit 190 performs a broadcast reception operation (S302). The signal level measurement unit 130 determines whether the level of a broadcast signal corresponding to the predetermined broadcast program exceeds the threshold $V_{Th}$ (S305).

If the results of the determination performed in operation S305 indicate that the measured signal level exceeds the threshold $V_{Th}$, the control unit 190 performs the scheduled recording of the predetermined broadcast program according to a set of rules (S310). Operations S302 through S312 are repeatedly performed until the scheduled recording of the predetermined broadcast program is completed.

If the results of the determination performed in operation S305 indicate that the measured signal level is less than the threshold $V_{Th}$, the control unit 190 controls the display unit 150 to display a warning message indicating that the scheduled recording of the predetermined broadcast program cannot be performed (S215). Thereafter, the control unit 190 determines whether the user wishes to cancel the scheduled recording of the predetermined broadcast program (S220). If the user wishes to cancel the scheduled recording of the predetermined broadcast program, the control unit 190 cancels the scheduled recording of the predetermined broadcast program (S225). On the other hand, if the user wishes not to cancel the scheduled recording of the predetermined broadcast program, the operation ends.

Figure 5:
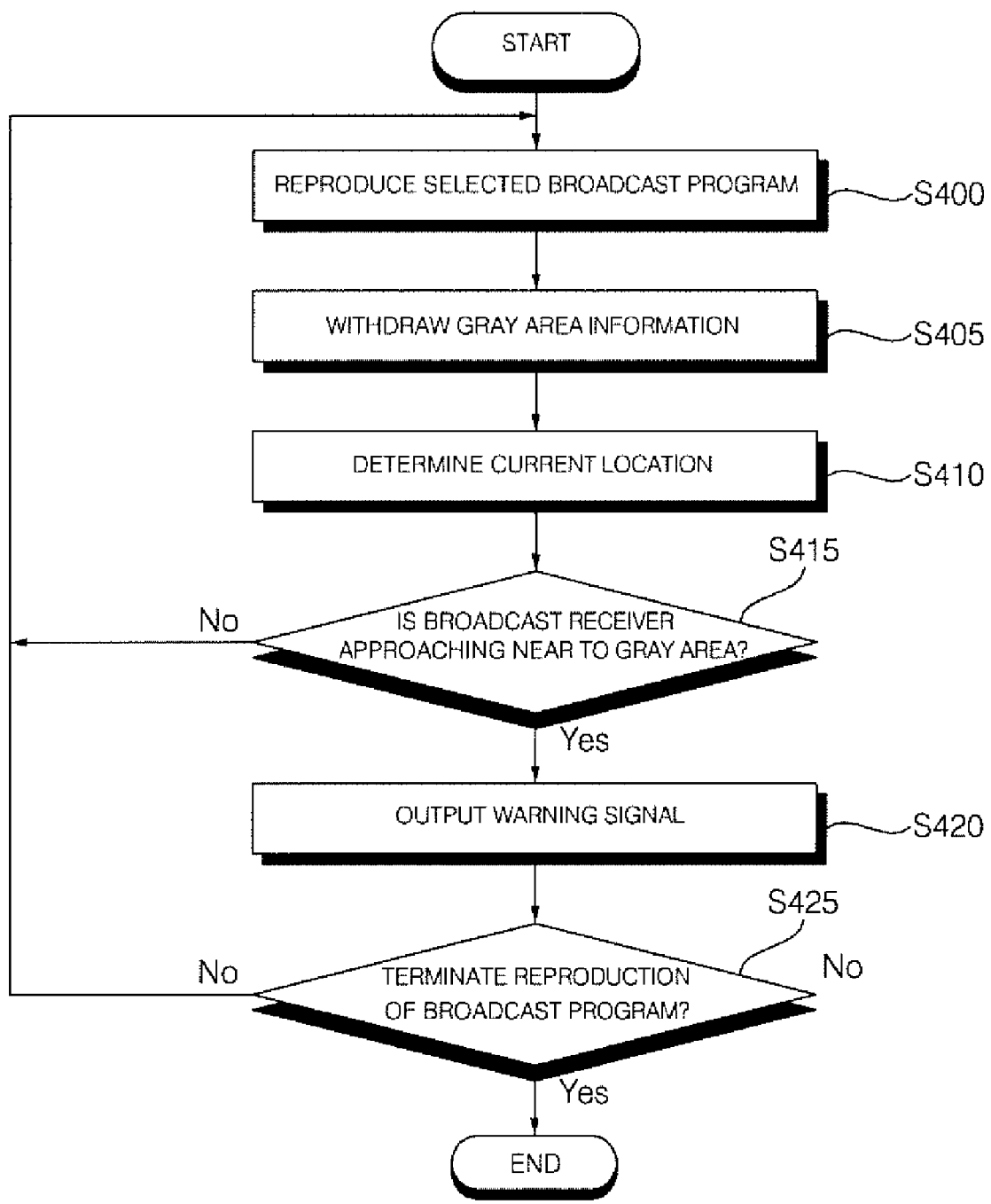
FIG. 5 is a flowchart illustrating a method of controlling an operation of a broadcast receiver according to another embodiment of the present invention.

FIG. 5 is a flowchart illustrating a method of controlling an operation of a broadcast receiver according to another embodiment of the present invention. More specifically, FIG. 5 illustrates the situation in which a user approaches a gray area while watching a broadcast program. Referring to FIG. 5, when a broadcast program is reproduced according to a request by a user (S400), the control unit 190 withdraws gray area information from the memory unit 180 (S405). Thereafter, the control unit 190 determines a current location of the broadcast receiver using the GPS processing unit 110 (S410). The gray area information may be received through a communication network, and then stored in the memory unit 180. The gray area information may include information regarding a number of areas in which the level of broadcast signals is less than a predefined threshold level.

The control unit 190 compares the current location of the broadcast receiver with the gray area information. If the result of the comparison indicates that the user is getting closer to a gray area, the control unit 190 outputs a warning signal to the user (S420).

The control unit 190 may display a map while outputting the warning signal to the user. Then, the control unit 190 may map the current location of the broadcast receiver onto the map. Also, the control unit 190 may display road information regarding how to avoid a gray area. Then, the user may decide to stop approaching close to a gray area and keep watching a broadcast program, or may decide to stop watching a broadcast program and enter a gray area (S425).

According to the method of the embodiment of FIG. 5, when the user enters a gray area during the reproduction of a broadcast program on his/her broadcast receiver, a warning signal is output to the user so that the reproduction of the broadcast program can be prevented from being terminated without the approval of the user.

As described above, when a scheduled broadcast reception function is set for a predetermined broadcast program, the level of a broadcast program corresponding to the predetermined broadcast program is measured before the arrival of a scheduled time for a scheduled reception of the predetermined broadcast program. Then, if the broadcast signal is too weak to execute the scheduled broadcast reception function for the predetermined broadcast program, a warning signal is output to a user from the broadcast receiver so that the user can take appropriate measures. Also, when the user enters a gray area while watching a broadcast program on the broadcast receiver, a warning signal is output to the user so that the reproduction of the broadcast program can be prevented from being terminated without the approval of the user. In addition, it is possible to provide the user with information regarding how to avoid a gray area.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of controlling operation of a mobile broadcast receiver, the method comprising:
   receiving, by the broadcast receiver, a request for receiving a broadcast program at a scheduled time to display the broadcast program on a display of the mobile broadcast receiver at the scheduled time;
   determining time to compare a broadcast signal with a predefined threshold level, which is a minimum signal level that is required for reception of the broadcast program, based on the schedule time;
   measuring a level of the broadcast signal for the broadcast program at the determined time that is prior to the scheduled time for receiving the broadcast program;
   outputting a warning signal prior to the scheduled time to indicate that the broadcast program cannot be received at a current location if the measured level of the broadcast signal is less than the predefined threshold level, the warning signal output visually or audibly;
   prompting a user to decide whether to cancel the request or to receive the broadcast program at the scheduled time after outputting the warning signal; and
   canceling the request or receiving the broadcast program at the scheduled time in response to an input received from the user such that the broadcast program is not received at the scheduled time if the request is canceled.

2. The method of claim 1, wherein the warning signal comprises an on-screen display message or a warning sound indicating that the broadcast program cannot be received.

3. The method of claim 1, further comprising:
   receiving a recording request.

4. The method of claim 3, further comprising:
   executing the recording request at the scheduled time.

5. The method of claim 1, wherein the broadcast program comprises a digital multimedia broadcasting (DMB) program.

6. The method of claim 1, wherein the predefined threshold level comprises a minimum signal level required for reception of the broadcast program.

7. A method of controlling operation of a mobile broadcast receiver, the method comprising:
   receiving a broadcast program and displaying the broadcast program;
   determining a current location of the broadcast receiver while the broadcast program is displayed;
   outputting a warning signal and displaying gray area information in a map when the broadcast receiver approaches a gray area such that the broadcast receiver is within a predetermined range of the gray area;
   mapping the current location of the broadcast receiver onto the map and displaying road information suggesting how to avoid the gray area; and
   stopping the displaying of the broadcast program when the broadcast receiver enters the gray area,
   wherein the gray area defines one or more geographic locations at which the broadcast receiver receives broadcast signals at a level that is below a defined threshold which is a minimum signal level that is required for reception of the broadcast program, and the predetermined range is a distance between a borderline of the gray area and a certain point outside the gray area.

8. The method of claim 7, wherein the gray area information is displayed while the warning signal is outputted.

9. The method of claim 8, further comprising:
   updating the current location of the broadcast receiver as the broadcast receiver approaches the gray area.

10. The method of claim 7, further comprising:
    comparing the current location of the broadcast receiver with the gray area information.

11. A mobile broadcast receiver comprising:
    an input unit which receives a request for receiving a broadcast program at a scheduled time to display the broadcast program on a display of the mobile broadcast receiver at the scheduled time;
    a broadcast signal reception unit which receives a broadcast signal prior to the scheduled time;
    a signal level measurement unit which measures a level of the broadcast signal received by the broadcast signal reception unit; and
    a control unit configured to determine time to compare the level of the broadcast signal with a predefined threshold level, which is a minimum signal level that is required for reception of the broadcast program, based on the schedule time, and to output a warning signal prior to the scheduled time to indicate that the broadcast program cannot be received at a current location if the level of the broadcast signal measured at the determined time is less than the predefined threshold level,
    wherein the control unit is further configured to prompt a user to decide whether to cancel the request or to receive the broadcast program at the scheduled time, and to cancel the request or receive the broadcast signal for the broadcast program at the scheduled time in response to an input received from the user such that the broadcast program is not received at the scheduled time if the request is canceled.

12. The broadcast receiver of claim 11, further comprising:
    an input unit which receives the input from the user in response to the prompting.

13. The broadcast receiver of claim 11, further comprising:
    a display unit which displays the warning signal.

14. The broadcast receiver of claim 11, further comprising:
    a sound processing unit which outputs the warning signal.

15. The broadcast receiver of claim 11, wherein the broadcast program comprises a digital multimedia broadcasting (DMB) program.

16. The broadcast receiver of claim 11, wherein the broadcast program is not displayed when the measured level of the broadcast signal is determined to be less than the predefined threshold level.

17. A mobile broadcast receiver comprising:
    a broadcast signal reception unit configured to receive a broadcast signal;
    a display unit configured to:
       display a broadcast program according to the broadcast signal, and
       display gray area information in a map; and
    a control unit configured to:
       determine a current location of the broadcast receiver while the broadcast program is displayed, compare the current location of the broadcast receiver with the gray area information, and control the broadcast signal and the gray area information to be displayed when the broadcast receiver approaches a gray area such that the broadcast receiver is within a predetermined range of the gray area, wherein the control unit is further configured to:

display the current location of the broadcast receiver on the map, display road information suggesting how to avoid the gray area, and stop the displaying of the broadcast program when it is determined that the broadcast receiver has entered the gray area, and wherein the gray area defines one or more geographic locations at which the broadcast receiver receives broadcast signals at a level that is below a defined threshold which is a minimum signal level that is required for reception of the broadcast program, and the predetermined range is a distance between a borderline of the gray area and a certain point outside the gray area.

18. The broadcast receiver of claim 17, wherein the display unit displays the gray area information while displaying the broadcast program.

19. The broadcast receiver of claim 17, further comprising: a memory unit for storing the gray area information.

20. The broadcast receiver of claim 17, further comprising: an input unit for receiving a command for selecting the broadcast signal.

21. The broadcast receiver of claim 17, further comprising: a global positioning system (GPS) processing unit which determines the current location of the broadcast receiver based on a GPS satellite signal.

22. The broadcast receiver of claim 17, wherein the broadcast signal comprises a broadcast signal corresponding to a digital multimedia broadcasting (DMB) program.

\* \* \* \* \*